United States Patent [19]

Jacobs et al.

[11] Patent Number: 5,626,093

[45] Date of Patent: May 6, 1997

[54] SHIFT LEVER INDICATOR APPARATUS AND METHOD

[75] Inventors: Randy Jacobs, St. Clair Shores; Robert W. Roossien, Grand Haven, both of Mich.

[73] Assignee: JSJ Corporation, Grand Haven, Mich.

[21] Appl. No.: 342,770

[22] Filed: Nov. 21, 1994

[51] Int. Cl.⁶ .................................................. G09F 9/40
[52] U.S. Cl. ............................ 116/28.1; 116/DIG. 20; 116/201
[58] Field of Search .................. 116/28.1, DIG. 20, 116/281, 282, 283, 201

[56] References Cited

U.S. PATENT DOCUMENTS

| | | | |
|---|---|---|---|
| 2,925,061 | 2/1960 | Thornburgh et al. | 116/DIG. 20 |
| 4,137,864 | 2/1979 | Lauper | 116/28.1 |
| 4,446,809 | 5/1984 | Dennis | 116/28.1 |
| 4,580,518 | 4/1986 | Scanlon et al. | 116/28.1 |

FOREIGN PATENT DOCUMENTS 6-137425  5/1994  Japan ........................ 116/28.1

Primary Examiner—William A. Cuchlinski, Jr.
Assistant Examiner—Willie Morris Worth
Attorney, Agent, or Firm—Price, Heneveld, Cooper, DeWitt & Litton

[57] ABSTRACT

A shift lever indicator assembly is provided for use in conjunction with a shift lever having a pivot axis. The shift lever indicator assembly comprises a housing having a housing track. An indicator member having a flag portion is slidably located within the housing track. The indicator member also includes an indicator arm connected to the flag portion, the indicator arm being connected to the shift lever such that the flag portion will be moved about the pivot axis of the shift lever when the shift lever is moved while allowing the flag portion to move lateral to an arc about the pivot axis.

22 Claims, 3 Drawing Sheets

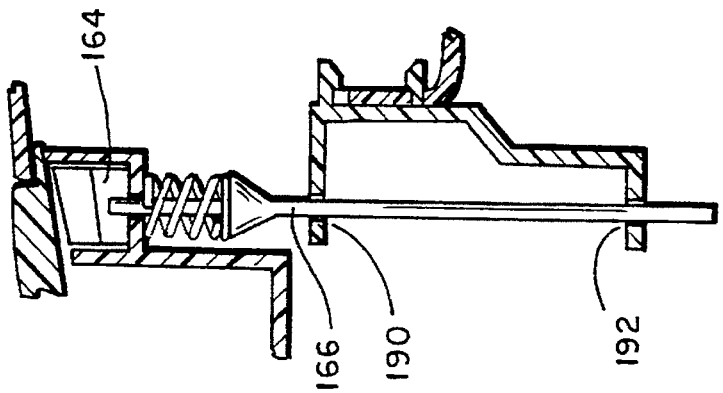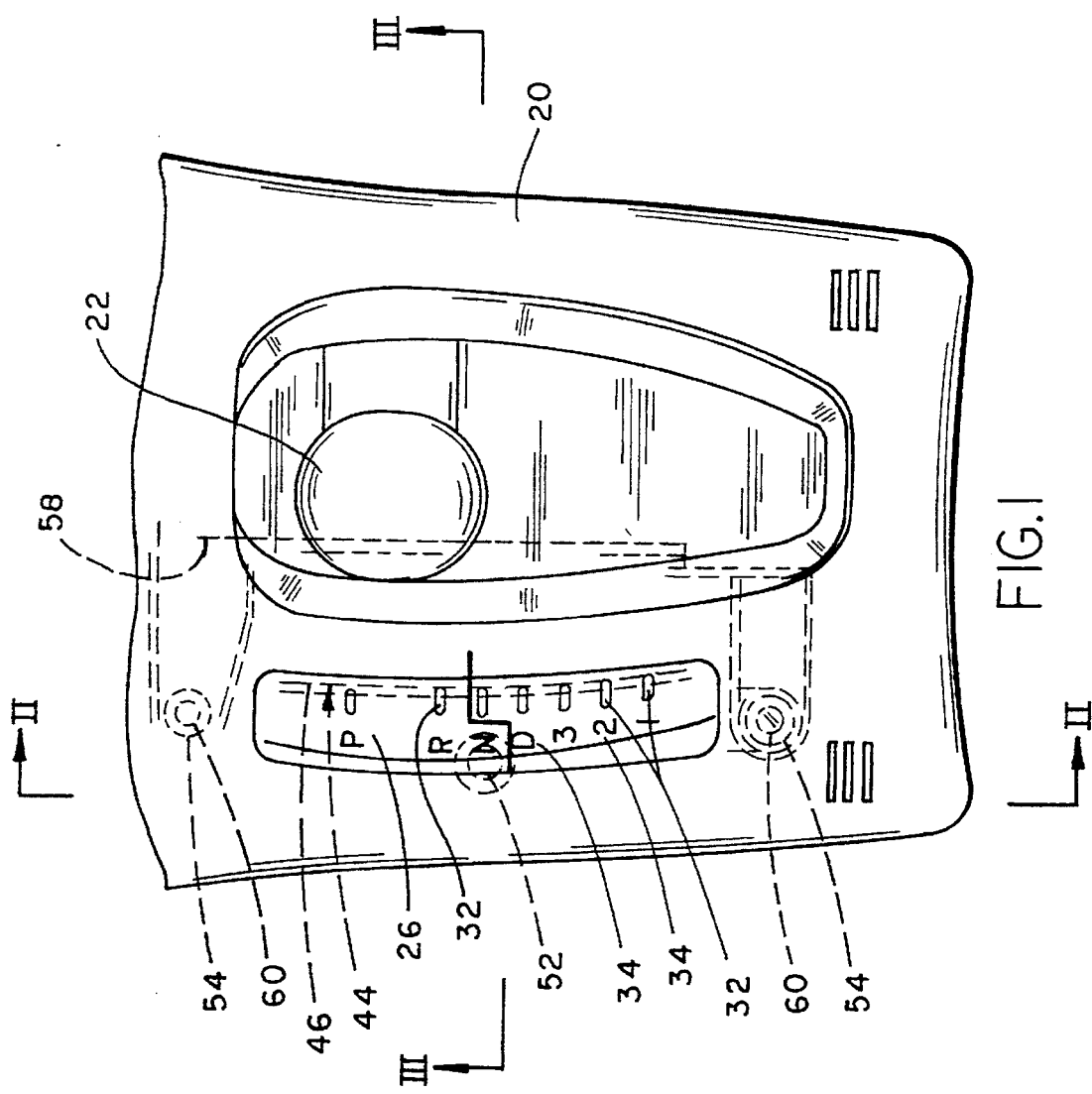

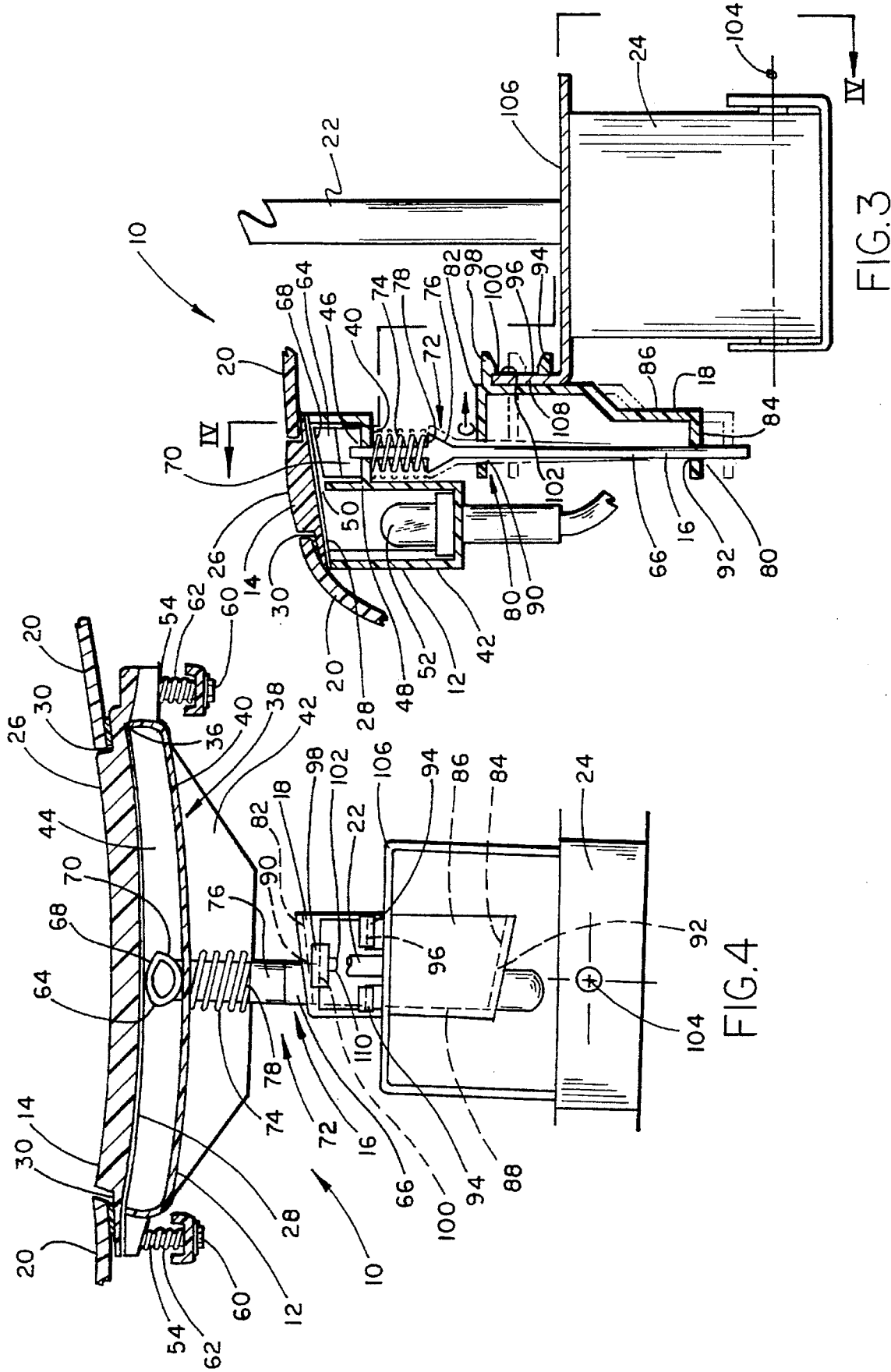

5,626,093

SHIFT LEVER INDICATOR APPARATUS AND METHOD

TECHNICAL FIELD

This invention relates to a shift lever indicator.

BACKGROUND ART

Traditionally, vehicles have utilized transmission shift levers mounted on a steering column or on the center console of the vehicle. In the case of an automatic transmission shift lever mounted on the center console, the position of the shift lever is commonly communicated to the operator via a lever indicator assembly located adjacent to the shift lever.

More specifically, the shift lever is typically fixably connected to a pivot assembly which in turn is operably linked to the transmission. A connector arm extends laterally from the pivot assembly and is connected in turn to the lever indicator assembly. The lever indicator assembly typically comprises an indicator member having a flag portion on the upper end. The bottom end of the indicator member is typically fixably connected to the connector arm in an approximately upright position. When the shift lever is moved by an operator of the vehicle in an arc about the pivot axis of the pivot assembly, the flag portion of the indicator member will correspondingly be moved in an arc about the pivot axis of the pivot assembly.

The flag portion of the indicator member is typically housed beneath a lens on the console such that the operator of vehicle can see the position of the flag. The position of the shift lever, and the particular gear engagement of the transmission, is communicated to the operator via position designations located along or adjacent to the lens itself, such as D for drive, N for neutral, R for reverse, and 1, 2, or 3 for first, second or third gears.

One of the problems with this typical prior art indicator assembly is that the flag portion of the indicator member is restricted to a specific path of travel in a single plane having one configuration, that being a circular arc about the fixed pivot axis of the pivot assembly.

This restricted path of travel is undesirable if an alternate path of travel is desired to solve packaging, viewability or aesthetic problems. For instance, it may be desirable to allow the flag portion of the indicator member to follow a circular arc, or a series of circular arcs, about a fixed axis, or fixed axes, which does not comprise the fixed pivot axis of the pivot assembly. Additionally, it may also be desirable to have the flag portion follow a path of travel in a lateral direction other than the path of travel along the plane of an arc about the fixed pivot axis of the pivot assembly.

SUMMARY OF THE INVENTION

An object of the present invention is to provide a new and improved shift lever indicator assembly which will allow the flag portion of an indicator member to travel along a variety of customized paths.

A shift lever indicator assembly is provided for use in conjunction with a shift lever having a pivot axis. The shift lever indicator assembly comprises a housing having a housing track. A flag portion of an indicator member is slidably located within the housing track. An indicator arm is connected to the flag portion. The indicator arm is also connected to the shift lever such that the flag portion can move lateral to an arc about the pivot axis.

In a preferred embodiment, the invention further includes a driver member to which the indicator arm is connected, the driver member being connected to the shift lever such that it will be moved about the pivot axis of the shift lever. The driver member has a top driver opening through which the indicator arm slidably runs and the top driver opening has a width such that the indicator arm may move laterally within the top driver opening thereby allowing the flag portion to slide within the housing track along a path of travel lateral to an arc about the pivot axis.

In an alternative preferred embodiment, the indicator arm of the slide member is flexible such that the slide member may flex and allow the flag portion to slide within the housing track along a path of travel lateral to an arc about the pivot axis.

The advantages of the present invention are provided by allowing the flag portion to move lateral to the plane formed by an arc about the pivot axis. In other words, the flag portion of the indicator member may be designed to travel along a path of travel outside the normal plane, that being an arc about the pivot axis.

In another preferred embodiment of the invention, the shift lever indicator assembly further includes the driver member having a guide opening which slidably engages the indicator arm of the indicator member, the driver member being connected—as already set forth—to the shift lever such that it will be moved about the pivot axis of the shift lever.

An advantage of this embodiment is provided by the indicator member being slidably connected to the driver member. As the driver member is moved about the pivot axis of the shift lever, the indicator arm of the indicator member can slide in and out of the guide opening of the driver member, thereby allowing the flag portion to follow a path within the housing track other than about the pivot axis of the shift lever. In other words, the flag portion of the indicator member may be designed to travel along the path of any arc, or any series of arcs, having a center point other than the pivot axis of the shift lever, while also being allowed to move in a lateral direction outside the plane of an arc about the pivot axis. As long as the indicator arm of the indicator member is long enough so that it will not disengage from the guide opening of the driver member, an infinite variety of travel paths is contemplated.

This will allow the shift lever indicator assembly to be designed and manufactured for maximum viewability, to satisfy packaging problems such as the need to avoid obstructions, and to satisfy any aesthetic requirements.

The above objects and other objects, features, and advantages of the present invention are readily apparent from the following detailed description of the Best Mode For Carrying Out The Invention.

BRIEF DESCRIPTION OF THE DRAWINGS

While embodiments of this invention are illustrated, the particular embodiment shown should not be construed to limit the claims. It is anticipated that various changes and modifications may be made without departing from the scope of this invention.

FIG. 1 is a plan view of a section of a console which houses the shift lever indicator arrangement of this invention;

FIG. 3 is a sectional view taken generally along the plane indicated by line 3—3 in FIG. 1;

FIG. 4 is a sectional view taken generally along the planes indicated by line 4—4 in FIG. 3; and FIG. 5 is a partial sectional view similar to FIG. 3 except showing an alternative embodiment of the invention.

BEST MODE FOR CARRYING OUT THE INVENTION

Figure 2:
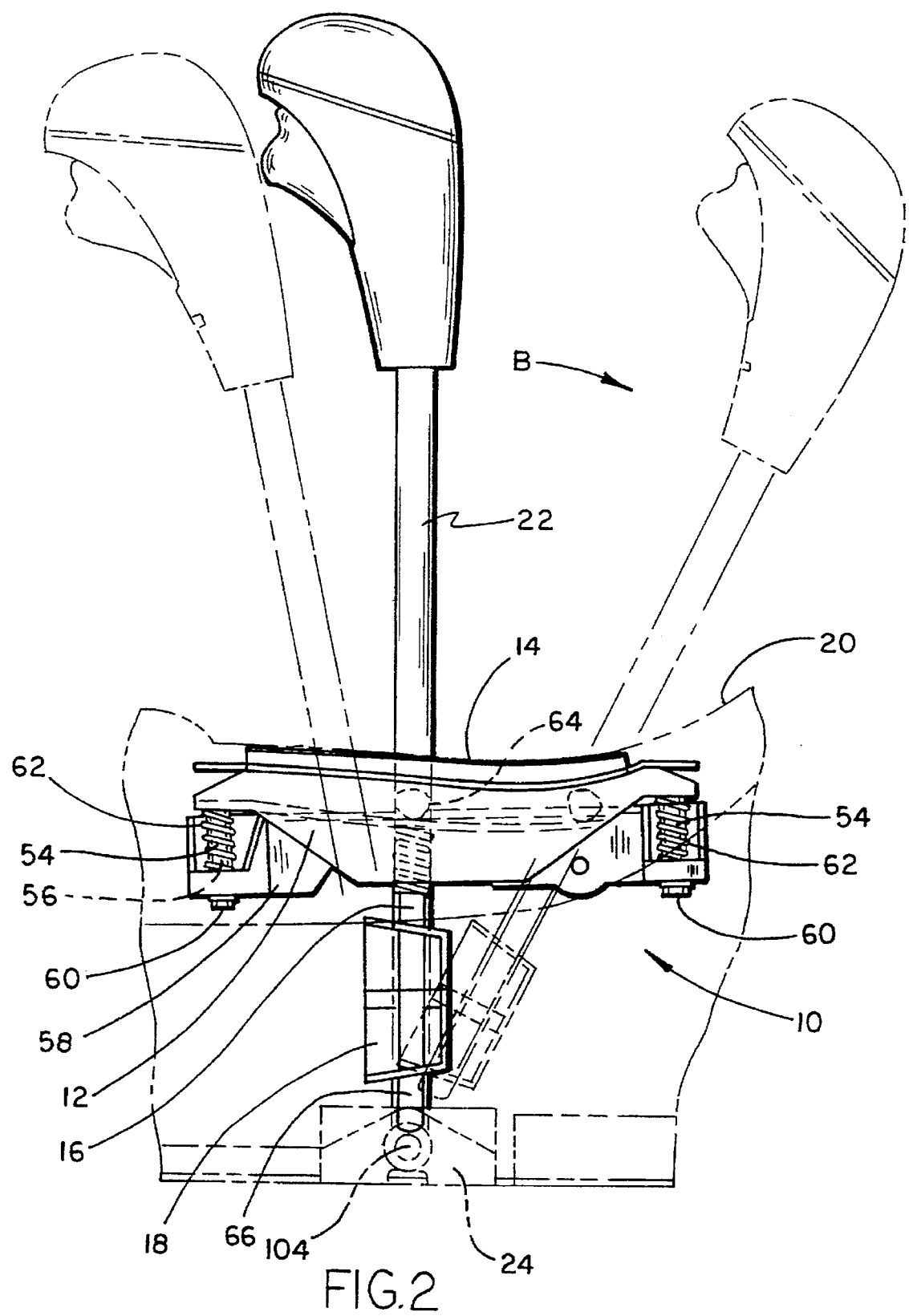
FIG. 2 is a sectional view taken generally along the plane indicated by line 2—2 in FIG. 1.

The embodiment shown in FIGS. 1–4 illustrates a shift lever indicator arrangement generally indicated at 10. The shift lever indicator arrangement at 10 includes a housing 12 having a lens 14, an indicator member 16, and a driver member 18. The shift lever indicator arrangement 10 can be typically mounted within a console housing 20 and connected to a shift lever 22 via a pivoting connector assembly 24.

As shown in FIGS. 3 and 4, the lens 14 has a lens top 26 and a lens bottom 28. The lens 14 may also have a recessed step 30 around its perimeter which allows the lens 14 to be mounted within the console housing 20 as shown in FIGS. 3 and 4 such that the lens top 26 is approximately flush with the exterior surface of the console housing 20. The lens top 26 may be transparent in its entirety or, as shown, may have lens windows 32 which are transparent or translucent while the remainder of the lens top 26, or the lens 12 throughout its entire thickness, is opaque. Adjacent each of the lens windows 32 is a position designation 34, such as D, N, R, 1, 2 or 3, which enables the user of the shift lever arrangement 10 to know the position of the shift lever 22 as will be explained.

The lens 14 may be manufactured from any suitable material. In fact, the windows 32 could be manufactured as separate components from any suitable transparent or translucent material. In that event, the lens windows 32 would be mounted to the remainder of the lens 14. In a preferred embodiment of the invention, the lens 14 is injection molded from clear acrylic. The lens windows 32 and position designations 34 may be manufactured by placing appropriate die cut art work within the acrylic lens 14 during the injection molding process. Because such a manufacturing process is well-known in the art, no further discussion will be provided here.

As shown in FIGS. 3 and 4, the lens bottom 28 is attached to the hollow housing 12. The housing 12 has a housing top 36, a flag housing 38 having a flag housing bottom 40, and a light housing 42. As shown in this embodiment of the invention, the lens bottom 28 covers substantially in its entirety the housing top 36 which is open to the lens bottom 28. As shown in FIGS. 1 and 3, the flag housing bottom 40 defines a housing track 44 which in this embodiment comprises a housing slot 46 running lengthwise along the center of the flag housing bottom.

As shown in FIG. 3, a middle housing wall 48 extends between the flag housing 36 and the light housing 42 to a height which leaves a light gap 50 between the top of the middle housing wall 48 and the lens bottom 28. A light source 52 is provided within the light housing 42. The housing 12 may be formed from any suitable plastic material such as a polycarbonate known as LEXAN® plastic.

As shown in FIGS. 1, 2 and 3, the housing also includes mounting posts 54 which define post bores 56. The housing 12 may be mounted within a console housing 20 via a bracket 58 which is mounted within the console housing 20 using any suitable means of connection. Because such mountings are well known in the art, they will not be discussed further here. The mounting posts 54 of the housing 12 are mounted to the bracket 58 via bolts or screws 60, or any other suitable connection means. In the embodiment shown, a spring 62 is compressed between the housing 12 and the bracket 58 such that the elevation of the housing 12 can be adjusted until the lens 14 fits properly and flush to the exterior surface of the console housing 20. Of course, if the dimensions of the console housing and the shift lever indicator arrangement are constant, this connection need not be adjustable.

As shown in FIGS. 2, 3 and 4, the indicator member 16 has a flag portion 64 and an indicator arm 66. The flag portion 54 has a top radiused surface 68 and a bottom radiused surface 70. The curvature of the top radiused surface 68 has a generally larger radius than the curvature of the bottom radiused surface 70.

As shown in FIG. 3, the top radiused surface 68 is inclined at an angle to the longitudinal axis of the indicator member 16. This angle of inclination allows the top radiused surface 68 to reflect light received from the light source 52 via the light gap 50 and to reflect that light through the lens windows 32 thereby allowing an operator of the vehicle to easily see the position of the flag portion 64 in dark conditions. In the preferred embodiment shown, the top radiused surface 68 is inclined at an angle of approximately 10°. Because such illumination methods are well-known in the art, they will not be discussed further here.

The indicator arm 66 is connected, movably or fixedly, to the flag portion 64. The indicator member may be formed of any suitable material, such as a plastic or metal. In a preferred embodiment, the flag portion 64 and indicator arm 66 are formed as one piece by injection molding from any suitable plastic such as a general grade of polyethylene. Because such materials and manufacturing methods are well-known in the art, they will not be discussed further here.

As shown in FIGS. 3 and 4, the width of the indicator arm 66 is slightly smaller than the width of the housing slot 46 such that the indicator arm 66 can slide along the housing slot 46 thereby allowing the flag portion 64 of the indicator member 16 to slide within the housing 12.

The indicator member 16 also includes two lock ramps 72 and a spring member 74. In the embodiment shown, the spring member 74 comprises a helical coil spring. The lock ramps 72 have inclined surfaces 76 inclined at an angle of approximately 30° to the longitudinal axis of the indicator member 16. The lock ramps 72 also have horizontal ramp tops 78 which together slightly exceed at least the inside diameter of the helical coil spring member 74 such that the coil spring member 74 may be slipped up the inclined surfaces 76 and over the horizontal ramp tops 78.

During assembly of the shift lever arrangement 10, the indicator arm 66 of the indicator member 16 is slid through the housing slot 46 before the lens bottom 28 is attached to the housing top 36. The coil spring member 74 can then be slipped up the inclined surfaces 76 of the lock ramps 72 and over the horizontal ramp tops 78 such that the coil spring is slightly compressed between the horizontal ramp tops 78 and the flag housing bottom 40. This will serve to maintain the bottom radiused surface 70 of the indicator member 16 against the flag housing bottom 40 during use. This will prevent the top radiused surface 68 of the flag portion 64 from rubbing against, and possible marring, the lens 14.

As shown in FIGS. 3 and 4, the driver member 18 defines a guide opening shown generally at 80. In the embodiment shown, the driver member 18 has a generally U-shaped configuration consisting of a top driver leg 82 and a bottom driver leg 84 interconnected by a vertical driver portion 86 and a stiffener 88. The width of the stiffener 88, as it extends away from the vertical driver portion 86, is equal to the dimension of the top driver leg 82 and the bottom driver leg 84 as those two legs extend away from the vertical driver portion 86. In this embodiment, the guide opening 80 comprises a top driver opening 90 defined by the top driver leg 82 and a bottom driver opening 92 defined by the bottom driver leg 84. As can be seen in FIG. 3, the indicator arm 66 of the indicator member 16 is inserted through the top driver opening 90 and bottom driver opening 92. As shown in FIGS. 3 and 4, with the exception of the width of the top driver opening 90, the dimensions of the top driver opening 90 and bottom driver opening 92 are slightly larger than the indicator arm 66 of the indicator member 16 such that the indicator arm 66 can easily slide back and forth through the top driver opening 90 and bottom driver opening 92. The width of the top driver opening 90 is somewhat larger to allow the indicator member 16 to rock back and forth as indicated by the phantom lines in FIG. 3.

The driver member 18 may be manufactured from any suitable material such as metal or plastic. In a preferred embodiment, the driver member is injection molded from DELRIN® plastic.

In the embodiment shown, as shown in FIGS. 3 and 4, the vertical driver portion 86 of the driver member 18 also defines two bottom snaps 94 having lips 96 and a top snap 98 having a lip 100. The top snap 98 has a locking key 102 which extends perpendicularly from the center of the top snap 98. The bottom and top snaps, 94 and 98, are used to operably connect the shift lever indicator assembly 10 to the shift lever 22 via the pivoting connector assembly 24.

The pivoting connector assembly 24 has a pivot axis 104. Because such pivoting assemblies are well known in the art, the pivoting connection between the pivoting connector assembly 24 and the pivot axis 104 will not be discussed further here. The pivoting connector assembly 24 includes a connecting arm 106 which is fixably connected to the pivoting connector assembly 24, such as by welding or otherwise, and extends laterally.

As shown in FIGS. 3 and 4, the end of the connecting arm 106 is bent into a vertical portion configured to comprise a snap bracket end 108. As shown, the snap bracket end 108 has a T-shape and is dimensioned such that the bottom vertical portion of the T runs between the bottom snaps 94 and the top horizontal portion of the T will snap into place between the bottom snaps 94 and top snap 98 under the lips 96 and the lip 100. As shown in FIGS. 3 and 4, the snap bracket end 108 also defines a snap slot 110 which engages the locking key 102 of the top snap 98 when engaged to prevent the snap bracket end 108 of the connecting arm 106 from sliding laterally out from under the lip 100 and lips 96 of the top and bottom snaps, 94 and 98, after being snapped into position. Because such snap connections are generally known in the art, they will not be discussed further here. It should also be noted that the connecting arm 106 could be connected to the vertical driver portion 86 of the driver member 18 by any number of suitable connection methods, such as by using screws, bolts, welds, or other connectors. Because such connection methods are generally known in the art, they will not be discussed further here.

As shown in FIGS. 2, 3 and 4, the shift lever 22 is connected fixably to the pivoting connector assembly 24 such that the shift lever may be moved in an arc about the pivot axis 104. The pivoting connector assembly 24 is also operably linked to the transmission of the vehicle such that movements of the shift lever 22 will pivot the pivoting connector assembly 24 about the pivot axis 104, thereby making gear changes within the transmission. Because such linking connections are well known in the art, they will not be discussed further here.

In operation, when the shift lever 22 is moved into various positions by the operator, the connecting arm 106 and the driver member 18 are likewise moved in an arc about the pivot axis 104. This will likewise move the indicator member 16 about the same pivot axis 104. However, because the indicator member 16 has the indicator arm 66, which may slide through the top and bottom driver openings 90 and 92, the flag portion 64 may follow a variety of vertical path configurations. In other words, depending on the configuration of the flag housing bottom 40 and as long as the indicator arm 66 of the indicator member 16 is long enough so that it will not slide out of the top and bottom driver openings, 90 and 92, the flag portion 64 may follow an infinite variety of vertical path configurations, not necessarily about the pivot axis 104. As shown in FIG. 2, as the shift lever is shifted in the direction indicated by the letter "B", the indicator arm 66 of the indicator member 16 slides out through the top and bottom driver openings 90 and 92 to allow the flag portion 64 of the indicator member 16 to follow the upward curvature of the housing 12.

As shown in FIG. 3, because the width of the top driver opening 90 allows the indicator arm 66 of the indicator member 16 to move laterally back and forth, the flag portion 64 of the indicator of the indicator member 16 may follow an infinite variety of housing slot configurations in the lateral or horizontal direction, including horizontal paths which are not necessarily straight. In accordance with the curvature of the housing track 44 shown in FIG. 1, if the shift lever is shifted in the direction indicated by the letter "B" as shown in FIG. 2, the indicator arm 66 of the indicator member 16 can move laterally in the direction "C" as shown in FIG. 3 to follow the housing track 44 curvature.

FIG. 5 shows an embodiment which is identical to the embodiments shown in FIGS. 1–4 with the exception that the width of the top driver opening 190 is approximately the same as the width of the bottom driver opening 192. As a result, the indicator arm 166 can still easily slide back and forth through the top driver opening 190 and the bottom driver opening 192 but cannot shift laterally within the width of the top driver opening 190 as was the case in the previous embodiment. In this embodiment, and as indicated by the phantom lines in FIG. 5, the flag portion 164 may follow an infinite variety of horizontal paths within the flag housing via the flexibility of the indicator arm 166, which will bend according to where it runs through the top driver opening 190, as indicated by the phantom lines in FIG. 5.

In general, it has been found that a preferred radius of curvature of the top radiused surface 68 of the flag portion 64 is in the range of 15–20 mm. This preferred range of radius both maximizes the visibility of the flag portion 64 through the lens windows 32 of the lens 14 while also allowing the flag portion 64 to travel within the housing 12 without interference. In the embodiment shown, with the distance between the pivot axis 104 and the top radiused surface 68 ranging from approximately 11.1 cm to 12.8 cm, it has been found that the preferred radius of curvature of the top radiused surface 68 is approximately 15 mm.

Similarly, it has been found that the preferred radius of the bottom radiused surface 70 of the flag portion 64 is, in general, in the range of 5–9 mm. This range both allows the flag portion 54 to easily travel within the housing 14 without bending. In the particular embodiment shown, with the dimensions set forth, the preferred radius of curvature of the bottom radiused surface 58 has been found to be approximately 7 mm.

While particular embodiments of the invention have been illustrated and described, it will be obvious to those skilled in the art that various changes and modifications may be made without departing from the invention. It is intended that the following claims cover all such modifications and all equivalents that fall within the true spirit and scope of this invention.

What is claimed is:

1. A shift lever indicator assembly for use in conjunction with a shift lever having a pivot axis, the shift lever indicator assembly comprising:

a housing having a housing track with a bottom slot and also a housing top;

an indicator member having a flag portion slidably located within the housing track for viewing through the housing top and an indicator arm extending through the bottom slot and connected to the flag portion, the indicator arm being configured for connection to the shift lever such that the flag portion will be moved generally tangentially to an arc about the pivot axis of the shift lever when the shift lever is moved while causing the flag portion to move lateral to the arc about the pivot axis.

2. The shift indicator assembly of claim 1 further including a driver member to which the indicator arm is connected, the driver member having a top driver opening through which the indicator arm runs, the top driver opening having a width such that the indicator arm may move laterally within the top driver opening thereby allowing the flag portion to slide within the housing track along a path of travel lateral to an arc about the pivot axis, the driver member being connected to the shift lever such that the driver member will be moved about the pivot axis of the shift lever when the shift lever is moved.

3. The shift lever indicator assembly of claim 1 wherein the indicator arm is flexible such that the indicator arm may flex and allow the flag portion to slide within the housing track along a path of travel lateral to an arc about the pivot axis.

4. The shift lever indicator assembly of claim 1 further including a driver member having a guide opening which slidably engages the indicator arm, the driver member being connected to the shift lever such that the driver member will be moved about the pivot axis of the shift lever when the shift lever is moved.

5. The shift lever indicator assembly of claim 1 wherein the indicator arm of the indicator member is flexible such that the indicator arm may flex and allow the flag portion to travel within the housing track along a path of travel lateral to an arc about the pivot axis.

6. The shift lever indicator assembly of claim 4 wherein the guide opening of the driver member consists of a top driver opening and a bottom driver opening, the top driver opening being wider than the bottom driver opening to allow the indicator arm to move laterally within the top driver opening such that the flag portion can slide within the housing track along a path of travel lateral to an arc about the pivot axis.

7. The shift lever indicator assembly of claim 1 further comprising a light source which can be used to illuminate the flag portion such that the flag portion can be easily viewed through the lens in dark conditions.

8. The shift lever indicator assembly of claim 7 wherein the housing has a light housing within which the light source may be contained and which allows the light source to illuminate the flag portion.

9. The shift lever indicator assembly of claim 1 wherein the flag portion of the indicator member has a top radiused surface and a bottom radiused surface, and the top radiused surface has a larger radius of curvature than the bottom radiused surface.

10. The shift lever indicator assembly of claim 1 further including a spring member which engages the indicator arm and slidably abuts the housing in a compressed state.

11. A shift lever indicator assembly for use in conjunction with a shift lever having a pivot axis, the shift lever indicator assembly comprising:

a housing having a housing track with a bottom slot and a housing top;

an indicator member having a flag portion slidably located within the housing track for viewing through the housing top and for movement generally tangentially to an arc about the pivot axis and an indicator arm extending through the bottom slot and connected to the flag portion; and a driver member having a guide opening which slidably engages the indicator arm of the indicator member, the driver member being adapted for connection to the shift lever such that the driver member will be moved generally radially about the pivot axis of the shift lever when the shift lever is moved.

12. The shift lever indicator assembly of claim 11 wherein the indicator arm of the indicator member is flexible such that the indicator arm may flex and allow the flag portion to slide within the housing track along a path of travel lateral to an arc about the pivot axis.

13. The shift lever indicator assembly of claim 11 wherein the guide opening of the driver member consists of a top driver opening and a bottom driver opening, the top driver opening being wider than the bottom driver opening to allow the indicator arm to move laterally within the top driver opening such that the flag portion can slide within the housing track along a path of travel lateral to an arc about the pivot exit.

14. The shift lever indicator assembly of claim 11 further comprising a light source which can be used to illuminate the flag portion such that the flag portion can be easily viewed through the lens in dark conditions.

15. The shift lever indicator assembly of claim 11 wherein the flag portion of the indicator member has a top radiused surface and a bottom radiused surface, and the top radiused surface has a larger radius of curvature than the bottom radiused surface.

16. The shift lever indicator assembly of claim 11 further including a spring member which engages the indicator arm and slidably abuts the housing in a slightly compressed state.

17. The shift lever indicator assembly of claim 11 wherein the housing has a lens through which the flag portion of the indicator member may be viewed.

18. A shift lever assembly comprising:

a shift lever having a pivot axis;

a housing having a housing track with a bottom slot and a housing top, the track including a section having a lateral component that extends in a direction parallel the pivot axis;

an indicator member having a flag portion slidably located within the housing track for viewing through the housing top; and a flexible indicator arm that extends through the bottom slot and is connected to the flag portion, the indicator arm being connected to the shift lever such that the indicator arm will be moved about the pivot axis of the shift lever when the shift lever is moved.

19. A method of indicating to an operator the position of a shift lever comprising steps of:

providing a shift lever having a pivoting connector assembly which pivots about a pivot axis;

providing a housing having a housing top, a bottom slot, and a housing track defining a path generally perpendicular the pivot axis, but including path sections that extend laterally in a direction parallel the pivot axis;

slidably locating a flag portion within the housing for viewing through the housing top;

attaching the flag portion to an indicator arm that extends through the bottom slot in the housing;

connecting the indicator arm to the pivoting connector assembly such that the flag portion will be moved generally tangentially to an arc about the pivot axis of the shift lever when the shift lever is moved while allowing the flag portion to move laterally; and sliding the flag portion along the track to indicate the position of the shift lever.

20. A shift lever assembly for a vehicle comprising:

a shift lever;

supporting means for pivotally supporting the shift lever for movement about a pivot axis between a plurality of gear shift portions, the movement of the shift lever between the gear shift positions defining a vertical plane extending vertically and in a longitudinal direction; and a shift lever indicator assembly including a track, a flag, and an indicator arm, the track being elongated and extending generally in the longitudinal direction parallel the vertical plane but having at least a portion that extends laterally in a second direction not parallel the plane, the flag being constructed to slidably follow the track as the shift lever is pivoted between the gear shift positions and having a portion visible from a location generally above the shift lever for indicating a selected one of the gear shift positions, the indicator arm being loosely connected to the shift lever for movement therewith and operably engaged with the flag so as to move the flag longitudinally and laterally as the shift lever is moved.

21. A shift lever as defined in claim 20, wherein said track includes a bottom slot, and one of said flag and said indicator arm extend through the bottom slot.

22. A shift lever as defined in claim 21, including a housing incorporating said track, said housing including a top through which said flag is visible.

* * * * *